Sept. 1, 1931.  W. J. KING  1,821,264
SEAT INDICATING SYSTEM
Filed April 3, 1929
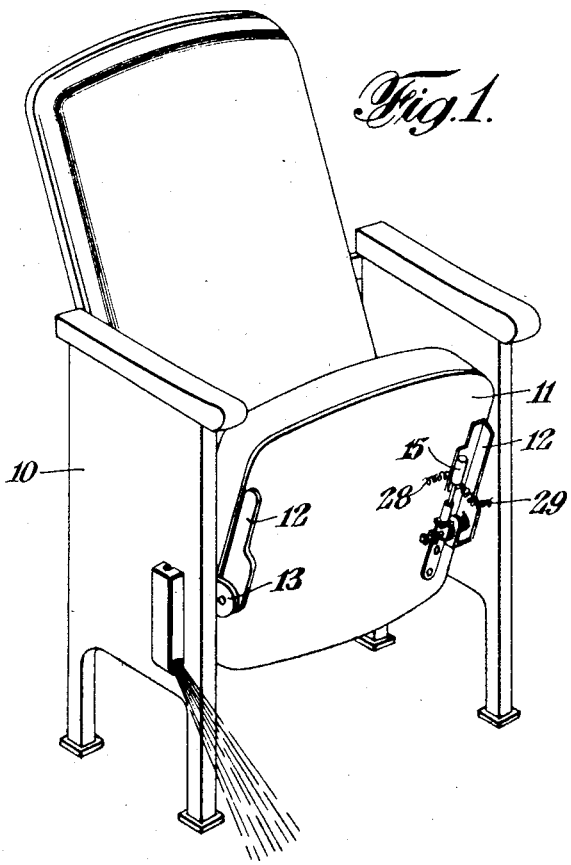
*Fig.1.*
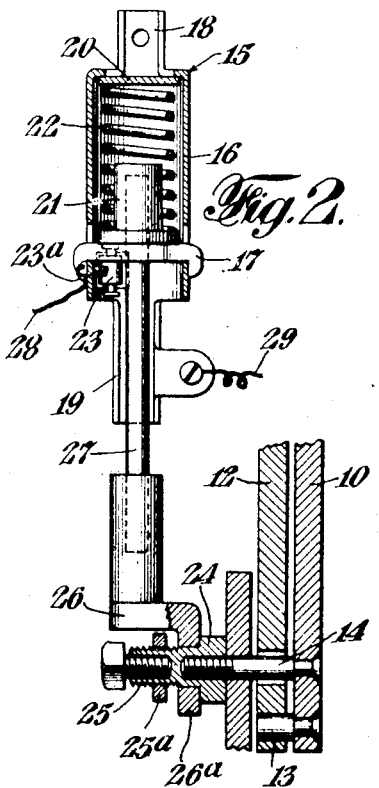
*Fig.2.*
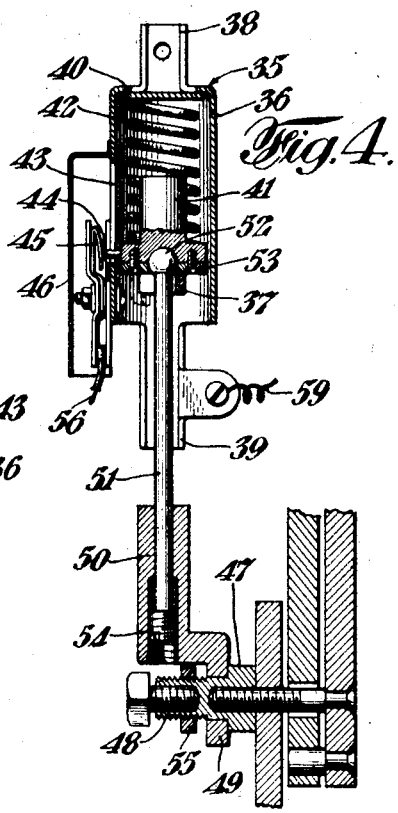
*Fig.4.*
*Fig.5.*
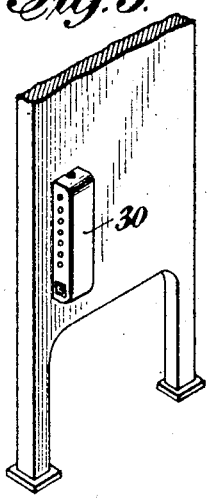
*Fig.3.*
INVENTOR
William J. King
BY
Kenyon & Kenyon
ATTORNEYS Patented Sept. 1, 1931

1,821,264

UNITED STATES PATENT OFFICE

WILLIAM J. KING, OF EAST ORANGE, NEW JERSEY, ASSIGNOR TO BILMARJAC CORPORATION, OF NEW YORK, N. Y., A CORPORATION OF DELAWARE

SEAT INDICATING SYSTEM

Application filed April 3, 1929. Serial No. 352,177.

This invention relates to systems for indicating vacant seats in a theatre. Such systems usually comprise a main indicator equipped with lights corresponding to the theatre seats and an aisle indicator for each row of seats equipped with lights corresponding to the various seats in the row. The circuit for these lights is controlled by a switch operated by the seat. Thus, when a seat is occupied the circuit for the lamps corresponding to such seat is broken, but when the seat is unoccupied the circuit is closed and the lamps lighted, thus indicating the vacant seat.

In the co-pending application of William J. King, Serial No. 212,416, filed August 6, 1927, of which this application is a continuation in part, such a vacant seat indicating system is fully disclosed and an object of this invention is an improved efficient, sturdy and long-lived seat switch for controlling the lamp circuits of such a system.

According to this invention the circuit controlling means or seat operated switch comprises a cylindrical metallic casing closed at one end and provided with a piston between which and the closed end is provided a coil spring. A contact member is insulatingly mounted in the casing in position to be engaged by the piston under the influence of the spring. The casing is firmly fastened to the seat and means are provided for moving the piston out of engagement with the contact member when the seat is occupied. This means comprises a plunger having one end pivotally supported by the seat frame and the other end engaging the piston. The pivotal connection between the plunger and seat frame is offset from the axis of rotation of the seat so that the lifting or lowering of the seat permits movement of the piston. Preferably the casing is grounded and the contact member is connected through the indicating lamps with the positive pole of a source of electrical energy. The spring is of sufficient strength that when a seat is unoccupied the spring forces the piston into engagement with the contact member and raises the seat slightly.

Other objects, novel features and advantages of this invention will be apparent from the following specification and accompanying drawings, wherein:

Fig. 1 is a perspective view of a theatre seat equipped with a switch embodying the invention;

Fig. 2 is an enlarged view partly in section, of the switch mechanism;

Fig. 3 is a perspective view of a portion of a seat frame showing the aisle indicator.

Fig. 4 is a section similar to Fig. 2 of a modified form of switch mechanism, and Fig. 5 is an enlarged detail view of the contact members of the switch mechanism.

Referring now to Figs. 1, 2 and 3, 10 designates the frame or stanchion from which is supported the seat 11. The seat 11 is attached to arms 12 which are pivoted to the frame 10 at 13. A post 14 mounted on the frame 10 extends through a curved slot in the arm 12 and serves to limit the downward or upward movement of the seat. This is a common type of theatre seat structure.

To the under face of the seat is attached a switch 15, part of which comprises a metal blank stamped to form cylindrical casing 16 having flat projecting end portions. Near one end of the casing a tie member 17 extends through apertures and its ends project over the edges of the apertures to hold together the edges of the blank. Projections 18 and 19 at the ends of the casing provide means for attaching the latter to the seat, these projections being equipped with apertures through which screws are passed. The end of the casing remote from the member 17 is closed by a disc or plate 20. Within the casing is arranged a piston 21 and between the piston 21 and the member 20 is provided a helical spring 22 which normally presses the piston 21 into contact with the member 17 which acts as a stop. Near the member 17, a contact member 23 is insulatingly mounted on the casing. A stud 24 is threaded on the end of the post 14 and replaces the nut commonly used. This stud is provided with a hollow extension 25 which is threaded both interiorly and exteriorly. The extension 25 passes through an aperture in the offset ear 26a of a member 26, the body of which is provided with a socket to receive one end of a plunger 27, the other end of which extends into a socket in the piston 21. On the stud 25 is provided a lock nut 25a which prevents movement of the member 26 axially of the stud. The pin 14 is offset relative to the axis of the seat 11 so that the casing 16 moves toward and away from the post 14 as the seat 11 is raised and lowered. The piston 21 is therefore caused to move back and forth in the casing 16 by the plunger 27 and the spring 22. When the seat is all the way down as when occupied, the piston 21 is held out of engagement with the contact 23, but when the seat is raised it engages therewith. The spring 22 is of sufficient strength that when the seat is not occupied, the spring lifts the seat and brings the piston 21 into engagement with the contact 23. As shown in Fig. 1, a wire 28 is connected to the contact 23 by the screw 23a and a wire 29 is connected to the ear on the projection 19, which wires are part of a circuit later to be described. Thus when the seat is raised, this circuit is closed, and when the seat is lowered, the circuit is broken.

An indicator 30 is provided on each aisle seat of a row of seats as shown in Figs. 1 and 3. This indicator is disclosed in detail in application, Ser. No. 212,416 and contains lines corresponding to the various seats in the row, the lines being controlled by the switches mounted on the seats.

Referring now to Figs. 4 and 5, the switch 25 comprises a cylindrical casing 36 having flat projecting end portions. Near one end of the casing a tie member 37 extends through apertures and its ends project over the edges of the apertures to hold together the edges of the blank. Projections 38 and 39 at the ends of the casing provide means for attaching the latter to a seat, these projections being equipped with apertures through which screws are passed. The end of the casing remote from the member 37 is closed by a disk or plate 40. Within the casing is arranged a piston 41 and between the piston 41 and the member 40 a helical spring 42 which normally presses the piston 41 into contact with the member 37 which acts as a stop. The casing 36 is provided with a groove 43 through which extends a pin 44 carried by the piston 41. On the outer wall of the casing is mounted a resilient contact member 45 with which the pin 44 which also is a contact member is adapted to engage when the piston 41 is in the position shown in Fig. 4. A protective housing 46 overlies the contact member 45.

A stud 47 is threaded on the end of the post 14 and replaces the nut commonly used on such post. This stud is provided with a hollow extension 48 which is threaded both interiorly and exteriorly. The extension 48 passes through an aperture in the offset ear 49 of a member 50, the body of which is provided with a socket to receive one end of a plunger 51, the other end of which is connected to the piston 41. The last mentioned end of the plunger 51 is provided with an enlarged head 52 which is seated in a socket in the piston 41 and held in position by a plate 53, thereby allowing limited universal movement of the plunger 51 with respect to the piston 41. The socket in the member 50 is threaded and in it is provided a threaded plug 54, by means of which variations in the relationships of the different parts may be compensated to effect proper and accurate operation of the switch. On the stud 48 is provided a lock nut 55 which prevents movement of the member 50 axially of the stud.

The pin 14 is offset from the axis of the seat 11 so that the casing 36 moves toward and away from the post 14 as the seat 11 is raised and lowered. The piston 41 is therefore caused to move back and forth in the casing 36 by the plunger 51 and the spring 42. When the seat is all the way down as when occupied, the piston 41 is held back so that the contact 44 does not engage the contact 45. However, a slight lift of the seat brings the pin 44 into engagement with the contact member 45, and as the pin 44 wipes over the contact 45, a clean surface of contact is provided at all times. The spring 42 is of sufficient strength that when the seat is not occupied, the spring lifts the seat and brings the pin 44 into engagement with the contact member 45. A wire 56 is connected to the contact member 45 and a wire 57 is connected to the ear on the projection 49 which are suitably connected with the signal lamps and a source of current so that the indicator lights over a seat are lighted whenever the seat is raised.

Such mechanism is arranged on the under part of the seat where it is completely out of the way so that there is little or no opportunity for seat users to strike against it and injure it or catch it with overcoats, umbrellas or the like. Moreover, because of its position, the wires leading to and from the switch are out of the way. By virtue of the unusual connection between the plunger and the piston and the adjustability provided by the plug in the member receiving the plunger, variations in the seats do not interfere with proper operation of the switch mechanism. Moreover, the wiping engagement between the contact pin and resilient contact member insures a clean surface of contact at all times so that the indicator lights will light up whenever the seat is raised.

I claim:

1. In a seat-indicating system, the combination of a frame, a seat pivotally mounted thereon, a casing secured to said seat, a piston in said casing, a spring interposed between one end of said casing and said piston, an electrical contact insulatingly supported by said casing and adapted to be engaged by said piston when in one position and a plunger having one end pivotally supported by said frame and the other end engaging said piston.

2. In a seat-indicating system, the combination of a frame, a seat pivotally mounted thereon, a casing secured to said seat, a piston in said casing, a spring interposed between one end of said casing and said piston, an electrical contact insulatingly supported by said casing and adapted to be engaged by said piston when in one position, and means connecting said piston to said frame whereby oscillation of the seat effects reciprocation of the piston.

3. In a seat-indicating system the combination of a frame, a seat pivotally mounted thereon, a casing secured to said seat, a piston in said casing, a post mounted on said frame, a plunger having one end pivotally connected to said post and the other end engaging said piston and an electrical contact insulatingly supported by said casing and adapted to be engaged by said piston when in one position.

4. In a seat-indicating system, a frame having a seat pivoted thereto, a casing attached to the bottom of said seat, a member reciprocally mounted therein, a second member pivoted to said frame and cooperating with said reciprocal member, and a contact member insulatingly mounted on said casing and adapted to be engaged by said reciprocal member.

5. A switch for seat-indicating systems comprising a casing to be attached to a seat pivoted to a frame, a piston reciprocally mounted therein, a plunger cooperating with said piston and having one end attached to the frame at a point offset from the axis of said seat and a contact insulatingly mounted on said casing to be engaged by said piston.

6. A switch for seat-indicating systems comprising a casing to be attached to a seat pivoted to a frame, a piston reciprocally mounted therein, a plunger cooperating with said piston and having one end attached to the frame at a point offset from the axis of said seat, a contact insulatingly mounted on said casing to be engaged by said piston and a spring in said casing normally pressing said piston into engagement with said contact.

7. A switch for seat-indicating systems comprising a casing to be attached to a seat pivoted to a frame, a piston reciprocally mounted therein, a member adapted to be connected to the seat frame, a plunger having one end seated in a socket in said member and a ball and socket connection between the other end thereof and said piston.

8. A switch for seat-indicating systems comprising a frame, a piston reciprocally mounted therein, a pin carried by said piston and extending through a slot in said casing, a spring interposed between said piston and the end of said casing, and a resilient contact member insulatingly supported by said casing in position to be engaged by the end of said pin.

9. A switch for seat-indicating systems comprising a casing adapted to be attached to a seat pivoted to a frame, a piston reciprocally mounted therein, a member adapted to be attached to said frame, an adjustable abutment carried by said member, and a plunger having one end engaging said abutment and a ball and socket connection at its other end with said piston.

10. A switch for seat-indicating systems comprising a casing adapted to be attached to a seat pivoted to a frame, a piston reciprocally mounted therein, a member adapted to be attached to the said frame, a plunger having one end seated in a socket in said member with the other end connected to said piston, and an adjustable abutment member arranged in said socket.

11. A switch for seat-indicating systems comprising a casing to be attached to a seat pivoted to a frame, a piston reciprocally mounted therein, a spring arranged in said casing and engaging said piston, a member adapted to be connected to the said frame, a plunger having one end seated in a socket in said member and the other end connected to said piston, and an adjustable member in said socket.

12. A switch for seat-indicating systems comprising a casing adapted to be attached to a seat pivoted to a frame, a piston reciprocally mounted therein, a member adapted to be attached to the said frame, a plunger having one end seated in a socket in said member, and a ball and socket connection between the other end thereof and said piston, and an abutment adjustably mounted in said socket.

13. A switch for seat-indicating systems comprising a casing to be attached to a seat pivoted to a frame, a piston reciprocally mounted therein, a spring arranged in said casing and engaging said piston, a member adapted to be connected to the said frame, a plunger having one end seated in a socket in said member, a ball and socket connection between the other end thereof and said piston, and an abutment adjustably mounted in said socket.

In testimony whereof, I have signed my name to this specification.

WILLIAM J. KING.